(12) United States Patent
Zhu et al.

(10) Patent No.: US 9,206,756 B2
(45) Date of Patent: Dec. 8, 2015

(54) CLOSED LOOP $NO_X$ REFERENCE MANAGEMENT FOR DPF REGENERATION BASED ON ENGINE OUT PARTICULATE MATTER VARIATION CONTROLLER

(71) Applicant: Cummins Inc., Columbus, IN (US)

(72) Inventors: Yongjie Zhu, Troy, MI (US); Vivek A. Sujan, Columbus, IN (US); Timothy R. Frazier, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/230,709

(22) Filed: Mar. 31, 2014

(65) Prior Publication Data

US 2015/0275803 A1 Oct. 1, 2015

(51) Int. Cl.
*F01N 3/20* (2006.01)
*F02D 41/14* (2006.01)
(Continued)

(52) U.S. Cl.
CPC ........ *F02D 41/1465* (2013.01); *F02D 41/0055* (2013.01); *F02D 41/025* (2013.01);
(Continued)

(58) Field of Classification Search
CPC ..... F01N 3/0231; F01N 3/2066; F01N 9/002; F01N 13/009; F01N 2430/06; F01N 2560/025; F01N 2560/026; F01N 2560/06; F01N 2560/08; F01N 2900/0408; F01N 2900/1402; F01N 2900/1602; F01N 2900/1606; F01N 2900/1621; F02D 41/025; F02D 41/1454; F02D 41/1461; F02D 2041/0017; F02D 2041/1422; Y02T 10/24; Y02T 10/42; Y02T 10/47

USPC .......... 60/274, 278, 285, 295, 297, 301, 311, 60/320
See application file for complete search history.

(56) References Cited

U.S. PATENT DOCUMENTS 6,227,182 B1 * 5/2001 Muraki et al. ........... 123/568.21
6,408,834 B1 6/2002 Brackney et al.
(Continued)

FOREIGN PATENT DOCUMENTS

WO   WO2008103110 A1   8/2008
WO   WO2008103111 A1   8/2008

OTHER PUBLICATIONS

Majewski, W. Addy et al., "Diesel Filter Regeneration", DieselNet Technology Guide, Diesel Particulate Filters, www.DieselNet.com, Copyright 2005, 22 pages.
(Continued)

*Primary Examiner* — Jason Shanske
*Assistant Examiner* — Jorge Leon, Jr.
(74) *Attorney, Agent, or Firm* — Faegre Baker Daniels LLP

(57) ABSTRACT

A method and related apparatuses and systems for operating an engine that provides a high level of $NO_X$ to regenerate particulate matter deposited on a particulate filter. The method includes producing $NO_X$ in response to a $NO_X$ excess capacity value of a $NO_X$ reduction device. The method optionally includes determining that particulate matter exceeds an enhanced passive regeneration threshold amount before providing a high level of $NO_X$. The method optionally includes producing a higher particulate emissions output value to warm the engine exhaust to bring an aftertreatment catalyst to an optimal operating temperature. The method can be implemented with a closed loop feedback controller, which may be configured to reduce particulate matter variation.

30 Claims, 8 Drawing Sheets

(51) Int. Cl.
*F02D 41/02* (2006.01)
*F02D 41/00* (2006.01)
*G05B 15/02* (2006.01)
*F01N 3/023* (2006.01)
*F01N 13/00* (2010.01)
*F01N 9/00* (2006.01)

(52) U.S. Cl.
CPC .......... *F02D41/029* (2013.01); *F02D 41/1461* (2013.01); *G05B 15/02* (2013.01); *F01N 3/0231* (2013.01); *F01N 3/2066* (2013.01); *F01N 9/002* (2013.01); *F01N 13/009* (2013.01); *F01N 2430/06* (2013.01); *F01N 2560/025* (2013.01); *F01N 2560/026* (2013.01); *F01N 2560/06* (2013.01); *F01N 2560/08* (2013.01); *F01N 2900/0408* (2013.01); *F01N 2900/1402* (2013.01); *F01N 2900/1602* (2013.01); *F01N 2900/1606* (2013.01); *F01N 2900/1621* (2013.01); *F02D 41/1454* (2013.01); *F02D 2041/0017* (2013.01); *F02D 2041/1422* (2013.01); *Y02T 10/24* (2013.01); *Y02T 10/42* (2013.01); *Y02T 10/47* (2013.01)

(56) References Cited

U.S. PATENT DOCUMENTS

| | | |
|---|---|---|
| 6,912,848 B2 * | 7/2005 | Bedapudi ................. 60/297 |
| 2008/0314028 A1 | 12/2008 | Christner et al. |
| 2009/0013666 A1 | 1/2009 | Jung |
| 2009/0014599 A1 | 1/2009 | Cylinder et al. |
| 2009/0023474 A1 | 1/2009 | Luo et al. |
| 2009/0100412 A1 | 4/2009 | Weiss |
| 2009/0100413 A1 | 4/2009 | Nash |
| 2009/0158706 A1 | 6/2009 | Sun |
| 2011/0023459 A1 * | 2/2011 | Nieuwstadt et al. ............ 60/285 |
| 2011/0162350 A1 * | 7/2011 | Ponnathpur ................. 60/274 |
| 2012/0053821 A1 * | 3/2012 | Wolfe et al. ................. 701/105 |
| 2012/0198824 A1 * | 8/2012 | Nishioka et al. ............. 60/297 |
| 2013/0261930 A1 | 10/2013 | Kurtz et al. |
| 2013/0333351 A1 | 12/2013 | Vyas et al. |

OTHER PUBLICATIONS

International Search Report and Written Opinion issued in PCT/US2015/17934, mailed Jun. 5, 2015, 16 pages.

* cited by examiner

CLOSED LOOP $NO_X$ REFERENCE MANAGEMENT FOR DPF REGENERATION BASED ON ENGINE OUT PARTICULATE MATTER VARIATION CONTROLLER

TECHNICAL FIELD

The technical field relates to internal combustion engines. More particularly, the technical field relates to control of emissions for internal combustion engines.

BACKGROUND

When an engine combusts fuel, particularly diesel fuel, the engine out exhaust includes some particulate matter (PM) (e.g. non-methane hydrocarbons) and some nitrogen oxide gases ($NO_X$). Particulate matter is the result of incomplete combustion of the fuel. $NO_X$ is the result of combusting with atmospheric air, which contains a high ratio of nitrogen ($N_2$) to oxygen ($O_2$). Particulate emissions and $NO_X$ emissions are regulated in many jurisdictions and must be limited in the tailpipe exhaust. To meet particulate emissions regulations or standards, a particulate filter is commonly used to trap particulate matter from the engine out exhaust, thereby removing it from tailpipe exhaust. To meet $NO_X$ emissions regulations or standards, a $NO_X$ reduction device converts $NO_X$ into $N_2$.

While catching particulate matter, however, the particulate filter can become clogged when high amounts of particulate matter deposit in the particulate filter, which reduces performance of the engine. The process of removing particulate matter from the particulate filter is called regeneration. Regeneration can be performed by exposing the particulate matter to $O_2$ at a high temperature (e.g. 500 to 600 degrees C.) or nitrogen dioxide ($NO_2$) at a relatively lower temperature (200 to 300 degrees C.). Engine out exhaust often contains a sufficient amount of oxygen to regenerate the particulate filter. However, because the temperature required to regenerate with oxygen is higher than a nominal temperature for exhaust during nominal engine operation, using oxygen to regenerate is often referred to as active regeneration. The high temperatures also wear down exhaust aftertreatment components more quickly.

On the other hand, engine out exhaust often contains a relatively small amount of $NO_2$ for regeneration. The small amount of $NO_2$ present results in passive regeneration, which does not require a temperature higher than during nominal engine operation. An oxidation device including an oxidation catalyst in the aftertreatment system can provide increased $NO_2$ amounts by converting nitric oxide (NO) to nitrogen dioxide. However, the increased amount of $NO_2$ is often insufficient to keep the particulate filter from clogging without also using active regeneration. Furthermore, $NO_2$ is an emission that must be limited at tailpipe exhaust. Thus, time periods of active regeneration by $O_2$ are still required to keep the particulate filter from clogging.

There remains a continuing need for improved methods to operate engine systems to meet emissions regulations.

SUMMARY

Various embodiments of the disclosure relate to a method, and related apparatuses and systems, comprising interpreting a $NO_X$ conversion excess capacity value corresponding to a $NO_X$ reduction device positioned downstream a particulate filter, interpreting a particulate amount deposited on the particulate filter, and in response to the $NO_X$ conversion excess capacity value and the particulate amount, operating an internal combustion engine to provide a $NO_X$ output value that is higher than an nominal $NO_X$ output value. In some embodiments, operating the engine comprises one of reducing an exhaust gas recirculation (EGR) flow value and increasing a fresh air flow value. In some embodiments, operating the engine comprises applying a gain value to a nominal control value, such as a nominal EGR fraction value. In some embodiments, operating the engine is further in response to determining a steady state or transient operating condition of the engine. In a transient operation condition, operating the engine comprises applying a predetermined factor of the gain value to a transient nominal control value.

In some embodiments, the engine is operated in an enhanced exhaust temperature operating condition. In some further embodiments, in response to the engine operating at a low temperature operating condition, the method further comprises operating the internal combustion engine at a particulate emissions output value that is higher than a nominal particulate output value. The higher particulate emissions output value is configured to warm the engine exhaust to an aftertreatment catalyst operating condition more quickly than a nominal warmup time.

While multiple embodiments are disclosed, still other embodiments of the present invention will become apparent to those skilled in the art from the following detailed description, which shows and describes illustrative embodiments of the invention.

Figure 1:
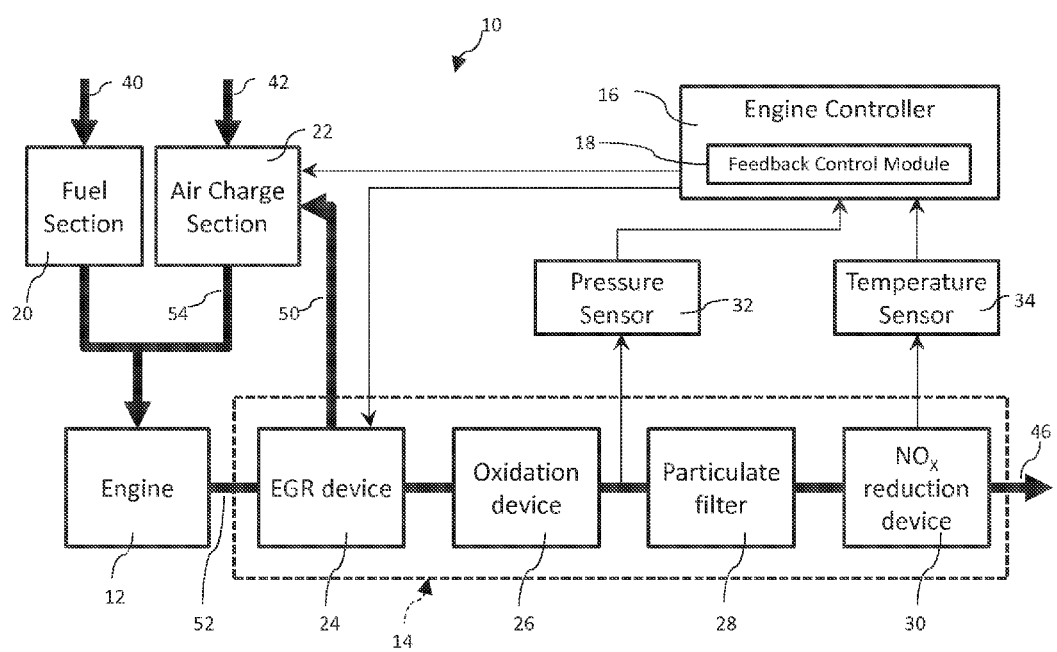
FIG. 1 is a schematic view of an engine system having an engine controller, according to some embodiments.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

FIG. 1 is a schematic view of an engine system 10 having an engine controller 16, according to some embodiments. The engine system 10 includes an engine 12 (e.g. internal combustion engine), an exhaust system 14 connected to the engine 12 to receive engine out exhaust 52, an engine controller 16 operatively coupled to various components within the engine system 10 to send and receive signals for controlling the engine system 10. The engine system 10 further includes a fuel section 20 for receiving stored fuel and providing fuel to the engine 12 for combustion and an air charge section 22 for intaking and providing air charge 54 to the engine 12 for combustion. For example, the fuel section 20 may provide diesel fuel 40 to the engine 12. The air charge section 22 optionally receives and mixes recirculated exhaust gas 50 with fresh air 42 to provide a mixed air charge 54 to the engine 12 for combustion. The fuel section 20 and air charge section 22 can be connected to the engine 12 in various ways known in the art.

Upon combustion of a charge of fuel and air, the engine 12 produces engine out exhaust 52, which is expelled into an exhaust system 14. The exhaust system 14 produces tailpipe exhaust 46 from the engine out exhaust 52. In some embodiments, the exhaust system 14 includes an exhaust aftertreatment system to reduce the emissions in the tailpipe exhaust 46 leaving exhaust system 14 by modifying the engine out exhaust 52. In some embodiments, the exhaust aftertreatment system comprises components, such as an exhaust gas recirculation (EGR) device 24, an oxidation device 26 including an oxidation catalyst downstream of the EGR device, a particulate filter 28 (e.g. diesel particulate filter, or DPF) downstream of the oxidation device, and a $NO_X$ reduction device 30 downstream of the particulate filter, for example.

The particulate filter 28 traps particulate matter. In some embodiments, the particulate filter 28 includes a diesel particulate filter (DPF). As the particulate matter accumulates within the particulate filter 28, pressure builds in the exhaust system 14 upstream of the particulate filter 28, sometimes known as backpressure. The backpressure increases as a result of the constricted exhaust flow. In some embodiments, the oxidation device 26 is configured to convert available nitric oxide (NO) into nitrogen dioxide ($NO_2$) and includes an oxidation catalyst.

The EGR device 24 diverts recirculated exhaust gas 50, which is a portion of the engine out exhaust 52, to the air charge section 22 for another combustion cycle to fully combust the exhaust. The $NO_X$ reduction device 30 is positioned downstream of the particulate filter 28. In some embodiments, the $NO_X$ reduction device 30 includes a selective reduction catalyst (SCR) device, a lean $NO_X$ catalyst, or other aftertreatment catalyst, for example. In some embodiments, the $NO_X$ reduction device 30 is designed to have a $NO_X$ conversion capacity greater than a nominal $NO_X$ output value during nominal engine operation. In some embodiments, the calculated difference between the $NO_X$ conversion capacity and the nominal $NO_X$ output value is the $NO_X$ conversion excess capacity value. In some embodiments, the $NO_X$ conversion capacity varies with temperature. For example, in some embodiments, the aftertreatment catalyst has optimal operating efficiency above a certain temperature threshold, such as 300 degrees Celsius for some SCR devices.

In some embodiments, the engine controller 16 is coupled to various engine components, including the air charge section 22, EGR device 24, a sensor 32, and a sensor 34 as shown. Sensor 32 provides a signal representing a particulate amount deposited on the particulate filter to the engine controller 16. For example, in some embodiments, the sensor 32 is positioned upstream of the particulate filter 28 and measures backpressure, which the engine controller 16 interprets to determine a particulate amount deposited on the particulate filter. Sensor 34 provides a signal representing the conversion capacity of the $NO_X$ reduction device 30. For example, in some embodiments, the sensor 34 is a temperature sensor and measures the temperature of the $NO_X$ reduction device 30, which the engine controller 16 interprets to determine a $NO_X$ conversion excess capacity.

In some embodiments, the engine controller 16 provides a signal to the air charge section 22 or the EGR device 24. For example, the engine controller 16 can provide a signal representing EGR flow, EGR fraction, fresh air flow, or charge flow. In some embodiments, the engine controller 16 is coupled to other sensors (not shown) for receiving signals, which can be interpreted, representing engine out $O_2$, lambda, or a feedback engine out $NO_X$. Lambda is the ratio of the air-to-fuel ratio to the stoichiometric air-to-fuel ratio in the engine. In some embodiments, as shown, the engine controller 16 includes a feedback control module 18 (e.g., feedback controller), which implements closed loop feedback control of an engine value, such as $NO_X$ output value, and may be further configured to reduce variation in engine performance characteristics, such as particulate matter emissions.

The engine controller 16 is configured to interpret a $NO_X$ conversion excess capacity value corresponding to a $NO_X$ reduction device 30 positioned downstream of a particulate filter 28, interpret a particulate amount deposited on the particulate filter, and in response to the $NO_X$ conversion excess capacity value and the particulate amount, produce a $NO_X$ output command corresponding to an internal combustion engine 12 providing a $NO_X$ output value that is higher than a nominal $NO_X$ output value. By taking advantage of the $NO_X$ conversion excess capacity value, the higher $NO_X$ output value increases the level of NO available for the oxidation device 26 to convert into $NO_2$, thereby providing an enhanced passive regeneration of particulate matter on the particulate filter 28, while meeting emissions regulations. The use of active regeneration can be eliminated or at least further reduced, which improves fuel economy and reduces wear on engine components over the life of the engine system 10.

In some embodiments including feedback control module 18, the engine controller 16 is configured to more precisely take advantage of the $NO_X$ conversion excess capacity value by accounting for variations, such as engine bias (e.g., variation from engine-to-engine during manufacture) and engine noise (e.g., random engine noise). In alternative embodiments, the feedback control module 18 is a separate controller from the engine controller 16.

Figure 2:
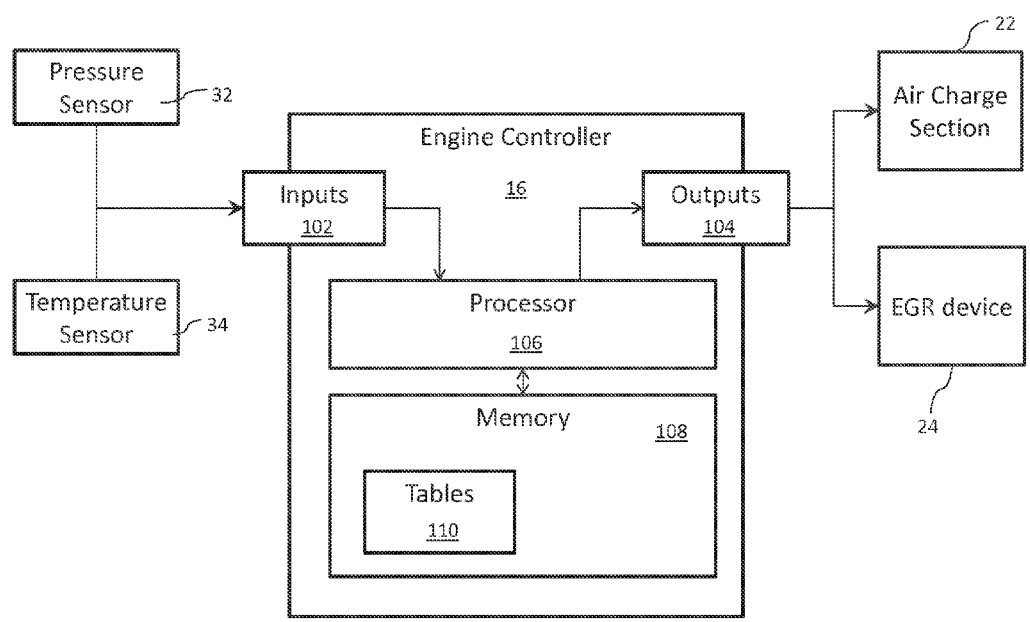
FIG. 2 is a schematic view of the engine controller of FIG. 1, according to some embodiments.

FIG. 2 is a schematic view of an exemplary engine controller 16, according to some embodiments. The engine controller 16 includes one or more inputs 102, one or more outputs 104, a processor 106 coupled to the inputs and outputs, and a memory 108 coupled to the processor. In some embodiments, one or more inputs 102 are adapted to receive a $NO_X$ conversion excess capacity value corresponding to the $NO_X$ reduction device 30 and a particulate amount deposited in the particulate filter 28. In the illustrated embodiment, the one or more inputs 102 are configured to receive a signal from pressure sensor 32 representing backpressure and a signal from temperature sensor 34 representing temperature of the $NO_X$ reduction device 30. In some further embodiments, the one or more inputs 102 are adapted to receive engine out $O_2$, lambda, or feedback engine out $NO_X$. In some embodiments, one or more outputs 104 are adapted to provide a $NO_X$ output command. In some further embodiments, the one or more outputs 104 are adapted to provide EGR flow, EGR fraction, fresh air flow, or charge flow. In the illustrated embodiment, the one or more outputs 104 provide signals to the air charge section 22 and EGR device 24.

The processor 106 can be configured to implement the methods and layouts of the disclosure described herein. In some embodiments, memory 108 stores various values. In some further embodiments, memory 108 stores values in tables 110 for lookup by processor 106. For example, separate tables 110 may store engine reference values for nominal emissions output values, engine reference values for higher emissions output values, gain values, predetermined fractions, steady state nominal control values, and transient sate nominal control values. The tables 110 can produce various outputs as a function of various inputs, such as engine conditions.

Many aspects of this disclosure are described in terms of sequences of actions to be performed by elements of a driver, controller, module and/or a computer system or other hardware capable of executing programmed instructions. These elements can be embodied in an engine controller 16 of an engine system 10, such as an engine control unit (ECU), also described as an engine control module (ECM), or in a controller separate from, and communicating with an ECU. In some embodiments, the engine controller 16 can be part of a controller area network (CAN) in which the controller, sensor, actuators communicate via digital CAN messages. It will be recognized that in each of the embodiments, the various actions for implementing the control strategy could be performed by specialized circuits (e.g., discrete logic gates interconnected to perform a specialized function), by application-specific integrated circuits (ASICs), by program instructions (e.g. program modules) executed by one or more processors (e.g., a central processing unit (CPU) or microprocessor), or by a combination of both. All of which can be implemented in a hardware and/or software of the ECU and/or other controller or plural controllers. Logic of embodiments consistent with the disclosure can be implemented with any type of appropriate hardware and/or software, with portions residing in the form of computer readable storage medium with a control algorithm recorded thereon such as the executable logic and instructions disclosed herein, and can be programmed, for example, to include one or more singular or multidimensional lookup tables and/or calibration parameters. The computer readable medium can comprise a random access memory (RAM), a read-only memory (ROM), an erasable programmable read-only memory (EPROM or Flash memory), an optical fiber, a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

Figure 3:
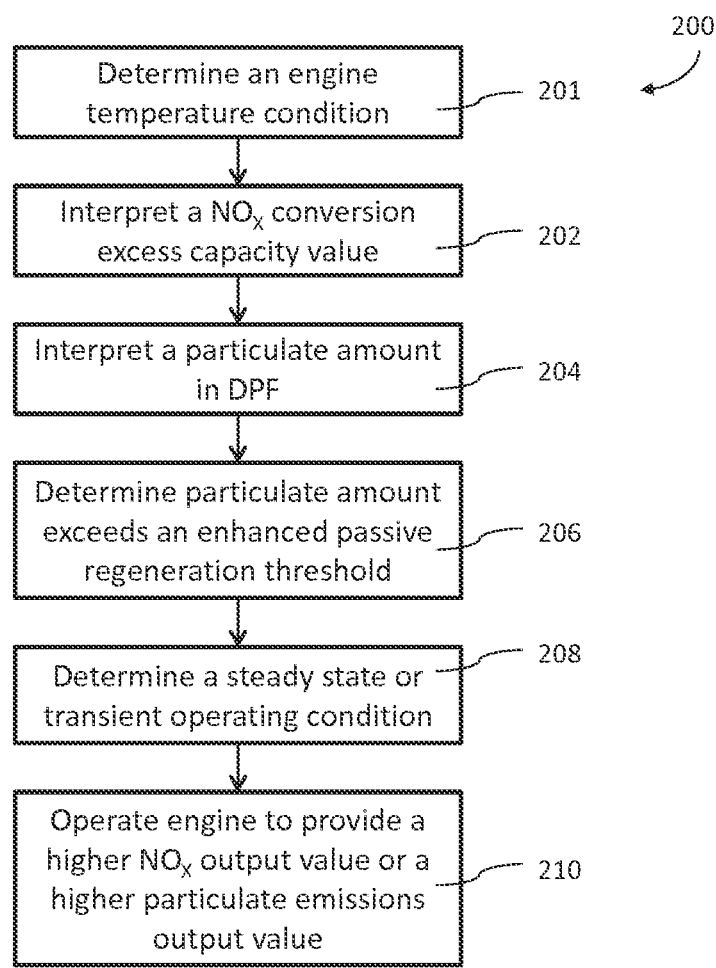
FIG. 3 is a schematic diagram of a method of operating an engine system to regenerate particulate matter, according to some embodiments.

FIG. 3 is a schematic diagram of a method 200 of operating an engine system 10 to regenerate particulate matter, according to some embodiments. In some embodiments, method 200 is implemented by engine system 10. Method 200 can begin with optional step 201 including determining an engine temperature condition. A low engine temperature condition may prompt a decision to operate the engine 12 to provide a higher particulate emissions output value in step 210.

In step 202, a $NO_X$ conversion excess capacity value is interpreted. In some embodiments, the $NO_X$ conversion excess capacity value is calculated by an operation consisting of determining that a temperature value of the $NO_X$ reduction device exceeds a threshold temperature value for conversion, determining that a conversion efficiency value of the $NO_X$ reduction device exceeds a conversion threshold value, determining that a space velocity value of the $NO_X$ reduction device is below a catalyst capacity value, or other determination related to determining the conversion capacity of the $NO_X$ reduction device. In some embodiments, the threshold temperature value for conversion is the temperature above which a $NO_X$ reduction device 30 exhibits optimal efficiency. For example, an aftertreatment catalyst above 300 degrees Celsius is in an operating condition having optimal efficiency.

In step 204, a particulate amount deposited on the particulate filter 28 is interpreted. In some embodiments, the particulate amount is determined from a measurement of backpressure. In step 206, whether the particulate amount exceeds an enhanced passive regeneration threshold is optionally determined. In some embodiments, the enhanced passive regeneration threshold is a value above which mere passive regeneration is insufficient to keep the particulate filter 28 from clogging, for example.

In step 208, a steady state or transient operating condition of the engine 12 is optionally determined. For example, a steady state operating condition can be described as an alpha-1 ($\alpha_1$) operating condition, and a transient operating condition can be described as an alpha-0 ($\alpha_0$) operating condition. In some embodiments, the steady state or transient operating condition can be something else, including a chi-level (e.g., $\chi_1$, $\chi_2$, etc.) operating condition related to a specific engine platform for high altitude, for example.

In step 210, an engine 12 is operated to provide an emissions output value higher than a nominal emissions output value. In some embodiments, for example, the engine 12 is operated to provide a higher $NO_X$ output value than a nominal $NO_X$ output value, or the engine 12 is operated to provide a higher particulate emissions output value than a nominal particulate emissions output value.

In some embodiments, in response to a $NO_X$ conversion excess capacity value and a particulate amount deposited on the particulate filter 28, the engine 12 is operated to provide a higher $NO_X$ output value, for example. In some embodiments, operating the engine is in response to the $NO_X$ conversion excess capacity exceeding a threshold and the particulate amount exceeding the enhanced passive regeneration threshold. The higher level of $NO_X$ output provides a higher level of NO for the oxidation device 26 to convert into $NO_2$ while taking advantage of the $NO_X$ conversion excess capacity value.

In some embodiments, operating the engine includes one of reducing an EGR flow value and increasing a fresh air flow value. In some embodiments, the engine 12 can be operated with a feedback control module 18 for more precise control of the emissions output value. In some embodiments, the feedback control module 18 applies a gain value to a nominal control value to reduce engine variation.

In some embodiments, the engine 12 is operated in response to the particulate amount exceeding an enhanced passive regeneration threshold amount. Yet in further embodiments, the engine 12 is operated further in response to a steady state operating condition. Still in further embodiments, the engine 12 is operated further in response to a transient operating condition and a predetermined fraction of the gain value is applied to the nominal control value.

In some embodiments, in response to determining a low engine temperature condition in step 201, the engine is operated in an enhanced exhaust temperature operating condition. In some embodiments, in response to a low temperature operating condition, the engine 12 is operated to provide a higher particulate emissions output value. In some embodiments, providing a higher particulate emissions output value is configured to warm the engine exhaust to an aftertreatment catalyst operating condition more quickly than a nominal warmup time, particularly from a cold start of the engine 12.

By operating the engine 12 to provide either a higher $NO_X$ output value or a higher particulate emissions output value, the method is able to control the temperature of the $NO_X$ reduction device 30 into an optimal efficiency operating condition, which allows the engine to then produce a higher $NO_X$ output value to reduce particulate matter deposits on the filter device 28.

Figure 4:
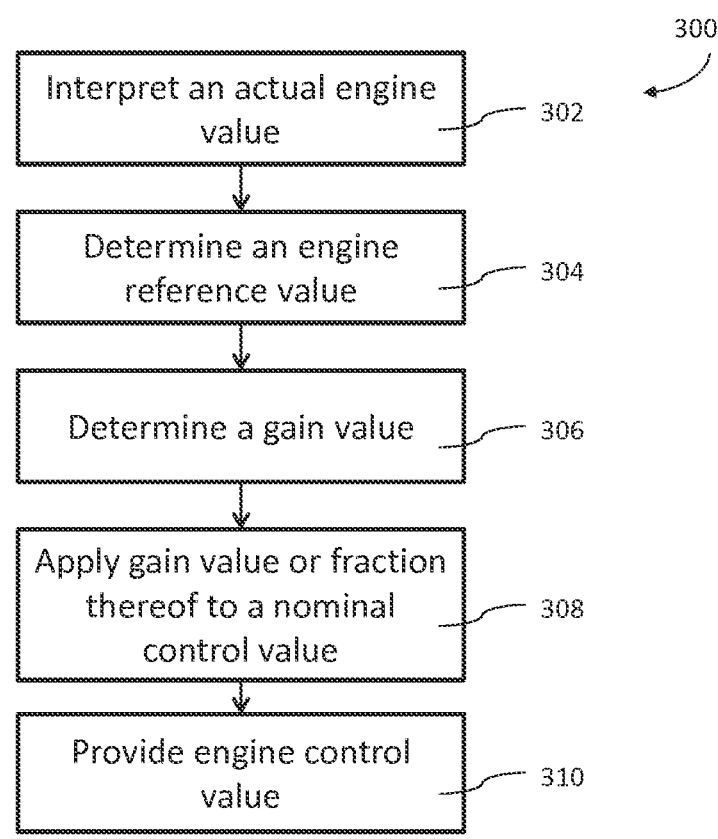
FIG. 4 is a schematic diagram of a method of using feedback control while operating an engine, according to some embodiments.

FIG. 4 is a schematic diagram of a method 300 of using feedback control while operating an engine, according to some embodiments. In some embodiments, method 300 is implemented by engine system 10 including a feedback controller. The method 300 allows for more precise control of the emissions output value produced by the engine 12 by minimizing differences, or bias, between an actual engine value and an engine reference value, or otherwise causing the actual engine value to converge toward the engine reference value. Furthermore, method 300 reduces engine-to-engine variation by employing a gain value. In some embodiments, the method 300 is adapted to accommodate a nominal emissions output value and a higher emissions output value by swapping a nominal engine reference value or table with an engine reference value or table configured to provide a higher emissions output value from the engine 10. In step 302, an actual engine value is interpreted. The actual engine value consists of a value related to engine out $O_2$, lambda, feedback engine out $NO_X$, or other engine value which can be measured directly or indirectly (e.g., by way of a virtual sensor).

In step 304, an engine reference value is determined. In some embodiments, the engine reference value corresponds to the actual engine value, but is determined based on a stored value. In some embodiments, the engine reference value is stored in a table, which outputs an engine reference value as a function of engine speed, engine load, and an engine control value. For example, the table outputs a reference engine out $NO_X$ value as a function of noisy EGR fraction (i.e., including engine noise) for a specific engine speed and engine load.

In step 306, a gain value is determined. The gain value can consist of values relating to EGR flow, EGR fraction, fresh air flow, charge flow, or other engine value. In some embodiments, the gain value is a stored value, which is pre-calibrated to capture variations between the engine 12 and a set of test cell engines similar to the engine 12, such as differences due to manufacturing tolerances for example. In some embodiments, the gain value is stored in a table, which outputs the gain value as a function of, for example, engine speed, engine load, and an error output value. In some embodiments, the error output value is a difference between the actual engine value of step 302 and the engine reference value of step 304, for example. In some embodiments, the gain value represents a steady state gain value.

In step 308, the gain value or a fraction of the gain value is applied to a nominal control value. In some embodiments, the nominal control value corresponds to an engine control value corresponding to the same EGR flow, EGR fraction, fresh air flow, or charge flow as the gain value, but is determined based on a stored value. In some embodiments, the nominal control value is selected for an operating condition, such as a steady state, transient, or chi-level operating condition. In some embodiments, the nominal control value is stored in a table, which outputs the nominal control value as a function of engine speed, engine load, and operating condition. For example, a nominal control value is selected for a steady state operating condition adjustment of the nominal control value based on engine speed and engine load. In some embodiments, the nominal control value comprises a nominal EGR fraction value.

In some embodiments, a steady state engine control value is produced by applying a steady state gain value to a steady state nominal control value. In some cases, a gain value for a transient operation condition is difficult to converge during operation. Instead, in some embodiments, the method 300 applies a predetermined fraction to a steady state gain value. The predetermined fraction is calibrated similar to the gain value to capture variations between the engine 12 and a set of test cell engines similar to the engine 12 but for a transient operating condition. In some embodiments, the predetermined fraction of the gain value is applied to a transient nominal control value to produce a transient engine control value. The transient nominal control value is determined similar to a steady state nominal control value, except it is configured for a transient operating condition.

In step 310, an engine control value is provided. The engine control value can be provided to an air charge section 22 to modify fresh air flow or be provided to an EGR device 24 to modify EGR flow, for example.

Figure 5:
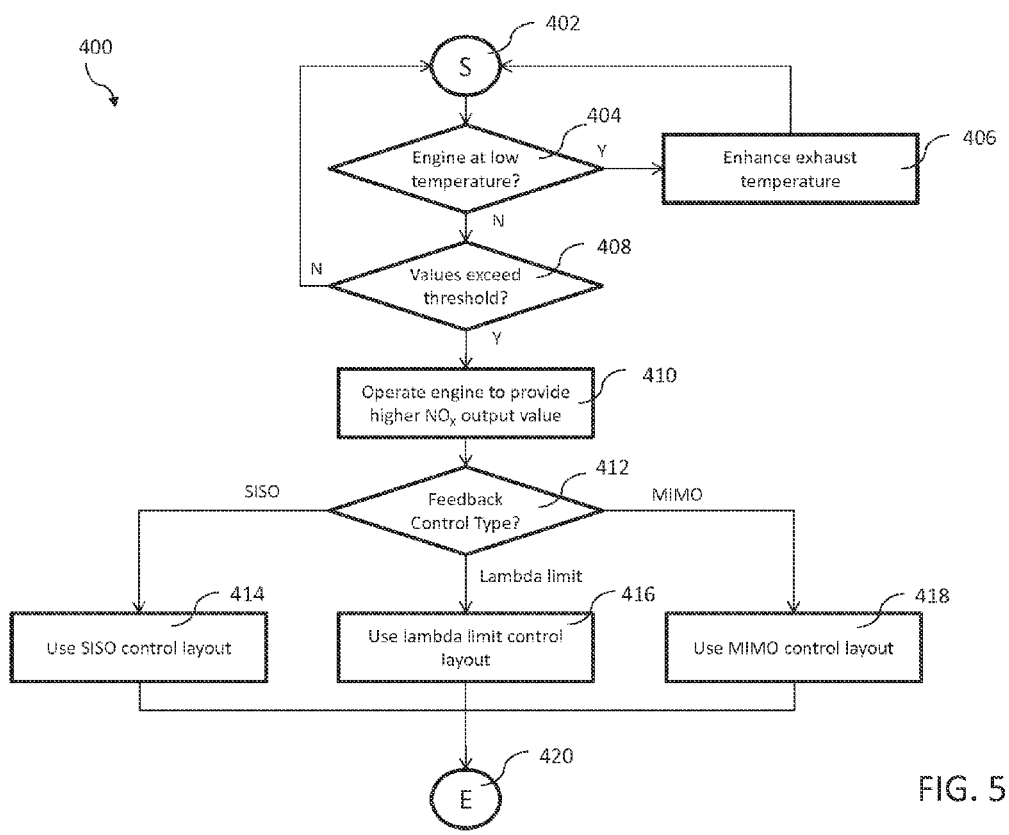
FIG. 5 is a schematic flowchart of a method of operating an engine system with the methods of FIGS. 3 and 4, according to some embodiments.

FIG. 5 is a schematic flowchart of a method 400 of operating an engine system 10 in accordance with methods of FIGS. 3 and 4, according to some embodiments. The method 400 makes decisions based on actual engine values and produces an engine control value, which can be used to operate the engine 12. In some embodiments, method 400 is a routine stored in memory 108 of engine controller 16 and executed by processor 106. At step 402, an engine system 10 has been enabled for nominal operation. At step 404, whether the engine is at low temperature is determined. A low temperature is common with a cold start. If the engine is at a low temperature, the method 400 proceeds to step 406 to operate the engine in an enhanced exhaust temperature operating condition. The exhaust temperature may be enhanced by increasing particulate emissions, as described in step 210 for example, in order to bring an aftertreatment catalyst or oxidation catalyst to optimal operating efficiency. The method 400 proceeds back to step 402, then step 404, which results in continual or discrete monitoring of whether the engine is at a low temperature.

If in step 404 the engine is not at a low temperature, the method proceeds to step 408 to determine whether one or more measured values exceed their respective thresholds. In some embodiments, step 408 implements steps of method 200. In step 408, for example, the $NO_X$ conversion excess capacity value may exceed a threshold, as described in step 202, and/or the particulate amount deposited on the particulate filter may exceed a threshold, as described in step 206. If these measured values exceed their respective thresholds, the method 400 proceeds to step 410. Otherwise, the method 400 returns to step 402 for continual or discrete monitoring with steps 404 and 408. In some embodiments, if the engine is not in a steady state operating condition, the method 400 returns to step 402 instead of proceeding to step 410.

In step 410, the engine 12 is operated to provide a higher $NO_X$ output value than a nominal $NO_X$ output value. In some embodiments, step 410 implements step 210 of method 200.

In some embodiments, operating the engine 12 includes at least one of reducing an EGR flow value and increasing a fresh air flow value.

The method 400 proceeds to selecting a feedback control type for operating the engine to provide the higher $NO_X$ output value in step 412. In some embodiments, each feedback control step implements method 300 to provide an engine control value. If a single-input, single output (SISO) control layout is selected, the method 400 proceeds to step 414. If a lambda limit control layout is selected, the method 400 proceeds to step 416. If a multi-input, multi-output (MIMO) layout is selected, the method 400 proceeds to step 418.

Alternatively, the feedback control selection can be predetermined before method 400 is used, obviating the need for step 412. Method 400 terminates at step 420 in the illustrated embodiment providing at least one engine control value. Alternatively, the method 400 can return to step 402 for continual or discrete monitoring.

Figure 6:
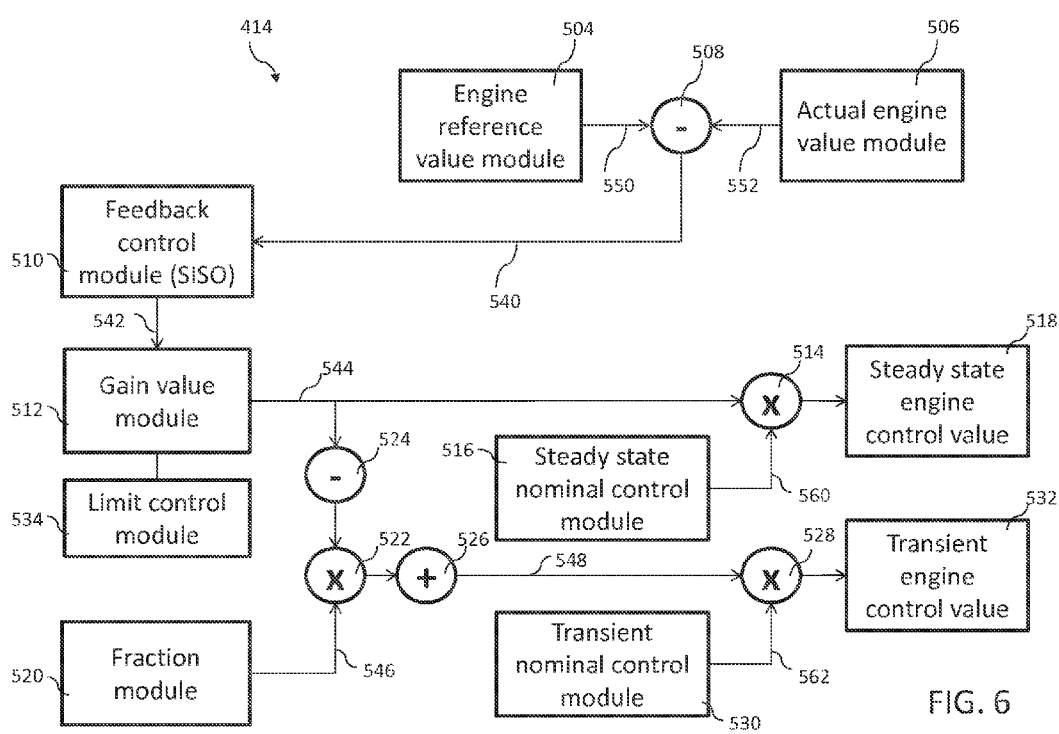
FIG. 6 is a schematic diagram of a single-input, single-output feedback control layout for use in the method of operating an engine system of FIG. 5, according to some embodiments.

FIG. 6 is a schematic diagram of a single-input, single-output feedback control layout 414 for use in the method of operating an engine system 10 of FIG. 5, according to some embodiments. As shown, layout 414 produces an engine control value, which can be used to operate the engine 12. In some embodiments, the modules of layout 414 are routines stored in memory 108 of engine controller 16 and executed by processor 106. The engine reference value module 504 is configured to determine an engine reference value 550 in a similar manner as described in step 304. Actual engine value module 506 is configured to determine an actual engine value 552 in a similar manner as described in step 302. Difference junction 508 produces an error value 540 based on the difference between the engine reference value 550 and the actual engine value 552.

Feedback control module 510 is an embodiment of feedback control module 18 and is configured as a SISO module to produce an error output value 542 as a function of the error value 540. In some embodiments, the feedback control module 510 is implemented as a PID controller or PI controller.

Gain value module 512 produces a gain value 544 as a function of the error output value 542 in a similar manner as described in step 306. The gain value module 512 is limited by an optional limit control module 534. In some embodiments, the limit control module 534 limits the gain value 544 to a maximum of 1 or another value based on other engine conditions, for example.

The steady state nominal control module 516 produces a steady state nominal control value 560 in a similar manner as described in step 308. Gain junction 514 applies the gain value 544 from gain value module 512 with the steady state nominal control value 560, in a similar manner as described in step 308, to produce a steady state engine control value 518. In some embodiments, the steady state engine control value 518 corresponds to EGR flow and can be provided to the EGR device 24 to reduce an EGR flow for a steady state operating condition.

The transient nominal control module 530 produces a transient nominal control value 562 in a similar manner as described in step 310. Gain junction 528 multiplies the predetermined fraction of the gain value 548 to the transient nominal control value 562 to produce a transient engine control value 532. The predetermined fraction of the gain value 548 is produced by: subtracting a value of 1 in difference junction 524 from the gain value 544, which is then multiplied in gain junction 522 to the predetermined fraction 546 produced by the fraction module 520, the output of which is added to a value of 1 in summing junction 526. In some embodiments, the transient engine control value 532 corresponds to EGR flow and can be provided to the EGR device 24 to reduce an EGR flow for a transient operating condition. In some embodiments, the steady state engine control value 518 and the transient engine control value 532 are combined for a chi-level operating condition.

Figure 7:
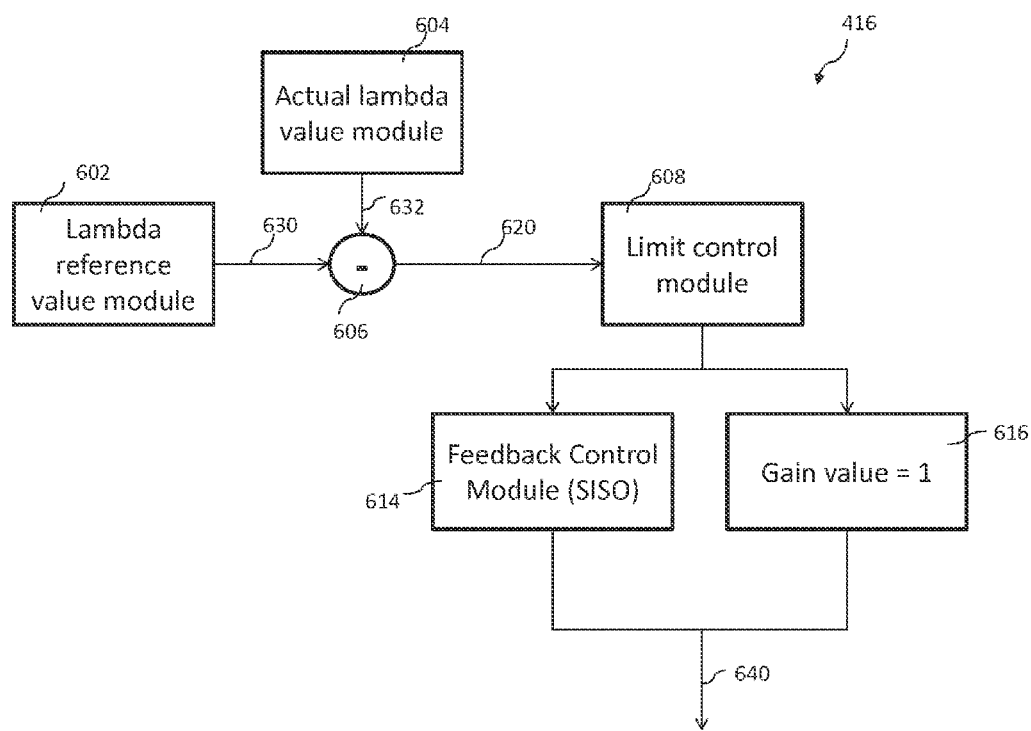
FIG. 7 is a schematic diagram of a limit feedback control layout for use in the method of operating an engine system of FIG. 5, according to some embodiments.

FIG. 7 is a schematic diagram of a lambda limit feedback control layout 416 for use in the method of operating an engine system 10 of FIG. 5, according to some embodiments. As shown, layout 416 produces a gain value 640, which can be used to produce an engine control value by being applied to a nominal control value in a gain junction, not shown but similar to steady state nominal control value 560, and produce an engine control value, not shown but similar to steady state engine control value 518. In some embodiments, the modules of layout 416 are routines stored in memory 108 of engine controller 16 and executed by processor 106. In the embodiment shown, the limit is a lambda-based limit.

Lambda reference value module 602 is configured to determine a lambda reference value 630 in a similar manner as described in step 304. Actual lambda value module 604 is configured to determine an actual lambda value 632 in a similar manner as described in step 302. Difference junction 606 produces an error value 620 based on the difference between the lambda reference value 630 and the actual lambda value 632.

Limit control module 608 determines whether to determine a gain value or bypass the gain value. In some embodiments, the limit control module 608 decides whether the absolute value of the error value 620 is decreasing over time. If so, the limit control module 608 sends the error value 620 to a feedback control module 614 to determine a gain value 640, similar to gain value 544. In some embodiments, the feedback control module 614 is an embodiment of feedback control module 18 and is a SISO controller. If the absolute value is not decreasing, the limit control module 608 will bypass the feedback control module 614 and produce a gain value 640 set to 1 in module 616.

Figure 8:
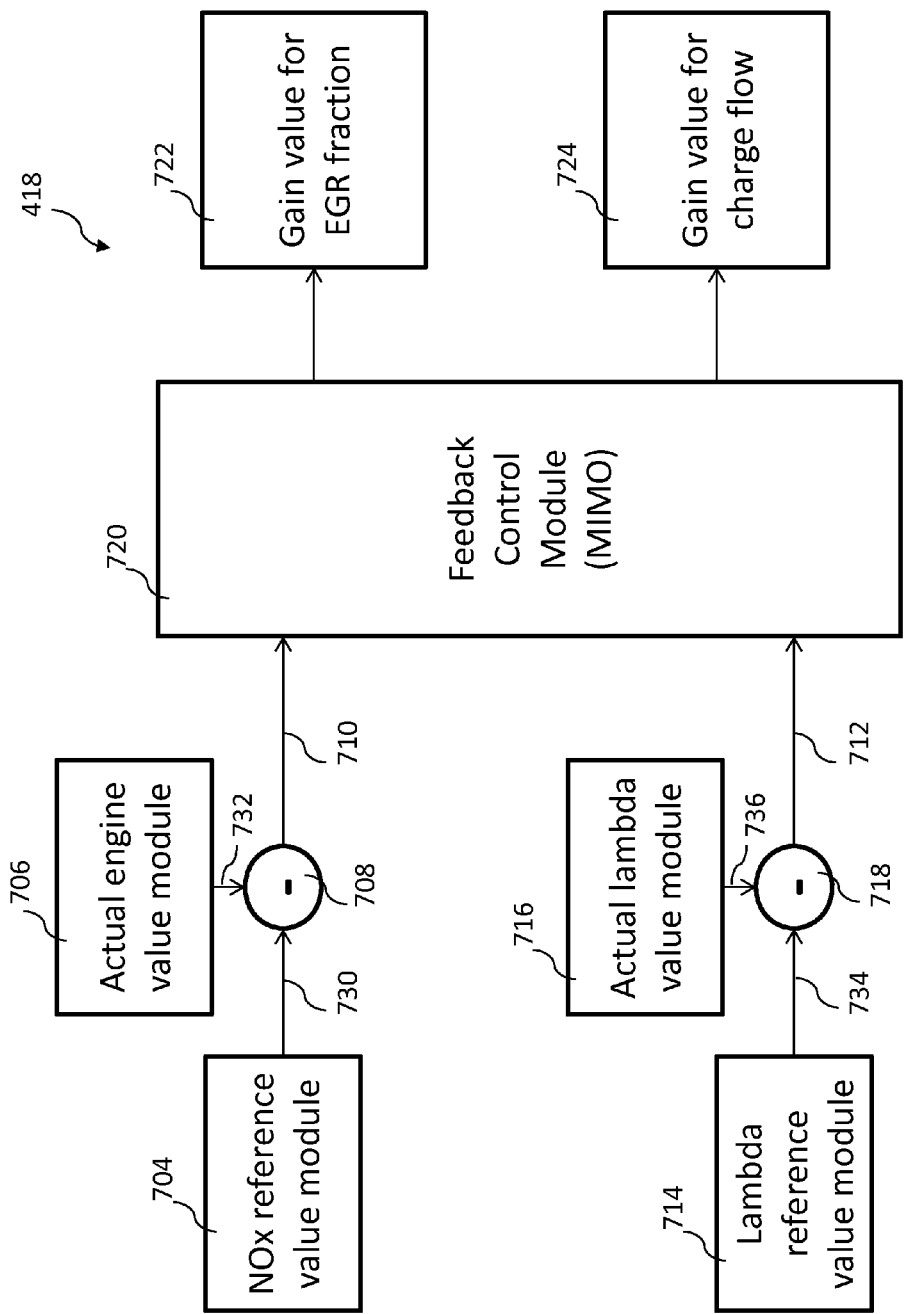
FIG. 8 is a schematic diagram of a multi-input, multi-output feedback control layout for use in the method of operating an engine system of FIG. 5, according to some embodiments.

FIG. 8 is a schematic diagram of a multi-input, multi-output feedback control layout 418 for use in the method of operating an engine system 10 of FIG. 5, according to some embodiments. As shown, layout 418 produces two gain values 722 and 724, which can be used to produce at least one engine control value to operate the engine 12. In some embodiments, the modules of layout 418 are routines stored in memory 108 of engine controller 16 and executed by processor 106. Feedback control module 720 is an embodiment of feedback control module 18 and produces more than one engine control value as a function of more than one actual engine value. As shown, the feedback control module 720 provides a gain value for EGR fraction 722 and a gain value for charge flow 724 as a function of $NO_X$ error value 710 and lambda error value 712. The gain values 722 and 724 can be used to operate an engine 12.

$NO_X$ reference value module 704 is configured to determine an engine reference value 730 in a similar manner as described in step 304. Actual engine value module 706 is configured to determine an actual engine value 732 in a similar manner as described in step 302. Difference junction 708 produces a $NO_X$ error value 710 based on the difference between the engine reference value 730 and the actual engine value 732, which is received by the feedback control module 720.

The lambda reference value module 714 is configured to determine a lambda reference value 734 in a similar manner as described in step 304. Actual lambda value module 716 is configured to determine an actual lambda value 736 in a similar manner as described in step 302. Difference junction 718 produces a lambda error value 712 based on the difference between the lambda reference value 734 and the actual lambda value 736, which is received by the feedback control module 720.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in association with another embodiment. The scope of the invention should, therefore, be determined with reference to the appended claims, along with the full scope of equivalents to which such claims are entitled.

The following is claimed:

1. A method, comprising:
   determining that an internal combustion engine is operating at a low temperature operating condition;
   operating the internal combustion engine at a particulate emissions output value that is higher than a nominal particulate emissions output value in response to the low temperature operating condition to warm the engine exhaust to an aftertreatment catalyst operating condition more quickly than a nominal warmup time corresponding to the nominal particulate output value;
   interpreting a $NO_X$ conversion excess capacity value corresponding to a $NO_X$ reduction device positioned downstream of a particulate filter;
   interpreting a particulate amount deposited on the particulate filter; and
   in response to the $NO_X$ conversion excess capacity value and the particulate amount, operating the internal combustion engine to provide a $NO_X$ output value that is higher than a nominal $NO_X$ output value.

2. The method of claim 1, wherein operating the internal combustion engine further comprises one of reducing an exhaust gas recirculation (EGR) flow value and increasing a fresh air flow value.

3. The method of claim 1, wherein operating the internal combustion engine further comprises applying a gain value to a nominal control value and the gain value is calibrated to adjust for variation between the internal combustion engine and a set of test cell engines.

4. The method of claim 3, wherein the nominal control value comprises a nominal EGR fraction value.

5. The method of claim 4, further comprising determining that the internal combustion engine is operating in a steady state operating condition, and wherein operating the internal combustion engine to provide the higher $NO_X$ output further in response to the internal combustion engine operating in the steady state operating condition.

6. The method of claim 3, wherein the gain value is determined in response to an error value.

7. The method of claim 1, wherein the interpreting a $NO_X$ conversion excess capacity value comprises at least one operation selected from the operations consisting of:
   determining that a temperature value of the $NO_X$ reduction device exceeds a conversion temperature value;
   determining that a conversion efficiency value of the $NO_X$ reduction device exceeds a conversion threshold value; and
   determining that a space velocity value of the $NO_X$ reduction device is below a catalyst capacity value.

8. The method of claim 1, wherein operating the internal combustion engine to provide the higher $NO_X$ output value further comprises operating a feedback controller for the $NO_X$ output value, the feedback controller having at least one input selected from the inputs consisting of: engine out $O_2$, lambda, and a feedback engine out $NO_X$.

9. The method of claim 8, the feedback controller further having at least one output selected from the outputs consisting of: EGR flow, EGR fraction, fresh air flow, and charge flow.

10. The method of claim 1, wherein operating the internal combustion engine to provide the higher $NO_X$ output further in response to the particulate amount exceeding an enhanced passive regeneration threshold amount.

11. The method of claim 1, wherein the low temperature operating condition is a cold start condition.

12. The method of claim 1, wherein operating the internal combustion engine to provide the $NO_X$ output value that is higher than the nominal $NO_X$ output value reduces the particulate amount deposited on the particulate filter.

13. A method, comprising:
   interpreting a $NO_X$ conversion excess capacity value corresponding to a $NO_X$ reduction device positioned downstream of a particulate filter;
   interpreting a particulate amount deposited on the particulate filter; and
   in response to the $NO_X$ conversion excess capacity value corresponding to a conversion efficiency value of the $NO_X$ reduction device exceeding a conversion threshold value and the particulate amount exceeding an enhanced passive regeneration threshold amount, operating an internal combustion engine to provide a $NO_X$ output value that is higher than a nominal $NO_X$ output value, wherein the operating step includes applying a gain value to a nominal control value and the gain value is calibrated to adjust for variation between the internal combustion engine and a set of test cell engines.

14. The method of claim 13, further comprising determining that the internal combustion engine is operating in a transient operating condition, wherein the gain value is selected for a steady state operating condition adjustment of the nominal control value, and wherein operating the internal combustion engine in the transient operating condition further comprises applying a predetermined fraction of the gain value to a transient nominal control value.

15. The method of claim 13, wherein operating the internal combustion engine to provide the higher $NO_X$ output value further comprises one of reducing an exhaust gas recirculation (EGR) flow value and increasing a fresh air flow value.

16. The method of claim 13, further including:
   interpreting at least one actual engine value selected from engine out $O_2$, lambda, and a feedback engine out $NO_X$;
   determining at least one engine reference value corresponding to the internal combustion engine providing the higher $NO_X$ output value; and
   in response to the at least one actual engine value and at least one engine reference value, determining the gain value;
   wherein applying the gain value to a nominal control value produces the at least one engine control value selected from EGR flow, EGR fraction, fresh air flow, and charge flow.

17. The method of claim 16, wherein the nominal control value comprises a nominal EGR fraction value.

18. A controller, comprising:
   one or more inputs adapted to receive a $NO_X$ conversion excess capacity value corresponding to a $NO_X$ reduction device positioned downstream of a particulate filter and a particulate amount deposited on the particulate filter;
   one or more outputs adapted to provide a $NO_X$ output command; and a processor coupled to the one or more inputs, coupled to the one or more outputs, configured to:
  determine that an internal combustion engine is operating at a low temperature operating condition;
  operate the internal combustion engine at a particulate emissions output value that is higher than a nominal particulate emissions output value in response to the low temperature operating condition to warm the engine exhaust to an aftertreatment catalyst operating condition more quickly than a nominal warmup time corresponding to the nominal particulate output value;
  interpret the $NO_X$ conversion excess capacity value corresponding to a selective reduction catalyst positioned downstream of the particulate filter;
  interpret the particulate amount deposited on the particulate filter; and
  in response to the $NO_X$ conversion excess capacity value and the particulate amount, produce a $NO_X$ output command corresponding to the internal combustion engine providing a $NO_X$ output value that is higher than a nominal $NO_X$ output value.

19. The controller of claim 18, wherein:
the one or more inputs are further adapted to receive at least one actual engine value selected from engine out $O_2$, lambda, and a feedback engine out $NO_X$;
the one or more outputs are further adapted to provide at least one engine control value selected from EGR flow, EGR fraction, fresh air flow, and charge flow; and
the processor is further configured to:
  interpret the at least one actual engine value;
  in response to the $NO_X$ output command, determine at least one engine reference value corresponding to the internal combustion engine providing the higher $NO_X$ output value;
  in response to the at least one actual engine value and at least one engine reference value, determine a gain value; and
  apply the gain value to a nominal control value to produce the at least one engine control value.

20. The controller of claim 19, wherein the nominal control value comprises a nominal EGR fraction value.

21. The controller of claim 19, wherein the processor is further configured to determine the internal combustion engine is operating in a steady state operating condition, and wherein the processor produces the $NO_X$ output command further in response to the internal combustion engine operating in the steady state operating condition.

22. The controller of claim 19, wherein the processor is further configured to determine that the internal combustion engine is operating in a transient operating condition and apply a predetermined fraction of the gain value to a transient nominal control value, wherein the gain value is selected for a steady state operating condition adjustment of the nominal control value.

23. The controller of claim 19, wherein the processor is further configured to determine that the internal combustion engine is operating at a low temperature operating condition the processor further configured to determine a nominal control value selected for operating the internal combustion engine to provide a particulate emissions output value that is higher than a nominal particulate emissions output value in response to the low temperature operating condition.

24. The controller of claim 18, wherein the processor is further configured to perform at least one operation as a step of interpreting a $NO_X$ conversion excess capacity value, which is selected from the operations consisting of:
  determining that a temperature value of the $NO_X$ reduction device exceeds a conversion temperature value;
  determining that a conversion efficiency value of the $NO_X$ reduction device exceeds a conversion threshold value; and
  determining that a space velocity value of the $NO_X$ reduction device is below a catalyst capacity value.

25. The controller of claim 18, wherein the processor is configured to produce the $NO_X$ output command further in response to the particulate amount exceeding an enhanced passive regeneration threshold amount.

26. An engine system, comprising:
  an internal combustion engine adapted to combust diesel fuel and produce an exhaust;
  a diesel particulate filter having a particulate amount deposited on the particulate filter positioned to receive the exhaust;
  a selective reduction catalyst having a $NO_X$ conversion excess capacity value and positioned to receive the exhaust downstream of the diesel particulate filter;
  one or more sensors adapted to detect at least one actual engine value selected from engine out $O_2$, lambda, and a feedback engine out $NO_X$; and
  an engine controller coupled to the internal combustion engine and the at least one sensor and configured to:
    determine that the internal combustion engine is operating at a low temperature operating condition;
    operate the internal combustion engine at a particulate emissions output value that is higher than a nominal particulate emissions output value in response to the low temperature operating condition to warm the engine exhaust to an aftertreatment catalyst operating condition more quickly than a nominal warmup time corresponding to the nominal particulate output value;
    interpret the $NO_X$ conversion excess capacity value, the particulate amount, and the at least one actual engine value;
    in response to the $NO_X$ conversion excess capacity value corresponding to a conversion efficiency value of the selective reduction catalyst exceeding a conversion threshold value and the particulate amount exceeding an enhanced passive regeneration threshold amount, produce a $NO_X$ output command corresponding to the internal combustion engine providing a $NO_X$ output value that is higher than a nominal $NO_X$ output value; and
    in response to the $NO_X$ output command and the at least one actual engine value, provide at least one engine control value selected from EGR flow, EGR fraction, fresh air flow, and charge flow.

27. The system of claim 26, wherein the controller is further configured to:
  in response to the $NO_X$ output command and the at least one actual engine value, determine a nominal control value corresponding to the internal combustion engine providing the higher $NO_X$ output value;
  in response to the $NO_X$ output command, determine at least one engine reference value corresponding to the internal combustion engine providing the higher $NO_X$ output value;
  in response to the at least one actual engine value and at least one engine reference value, determine a gain value; and
  apply the gain value to a nominal control value to produce the at least one engine control value.

28. The system of claim 27, wherein the engine controller is configured to determine that the internal combustion engine is operating in a steady state operating condition, and wherein the engine controller produces the $NO_X$ output command further in response to the internal combustion engine operating in the steady state operating condition.

29. The system of claim 27, wherein the engine controller is further configured to determine that the internal combustion engine is operating in a transient operating condition and apply a predetermined fraction of the gain value to a transient nominal control value, wherein the gain value is selected for a steady state operating condition adjustment of the nominal control value.

30. The system of claim 27, further including an EGR system configured to reduce EGR flow in response to receiving the operating value, wherein the nominal control value comprises a nominal EGR fraction value.

* * * * *